United States Patent
Fabre et al.

(10) Patent No.: US 8,657,543 B2
(45) Date of Patent: Feb. 25, 2014

(54) DEVICE FOR MECHANICALLY LINKING AT LEAST TWO PARTS HAVING COAXIAL BORES

(75) Inventors: Christian Fabre, Tournefeuille (FR); Alain Bignolais, Leguevin (FR)

(73) Assignee: Airbus Operations S.A.S., Toulouse (FR)

( * ) Notice: Subject to any disclaimer, the term of this patent is extended or adjusted under 35 U.S.C. 154(b) by 19 days.

(21) Appl. No.: 13/382,234

(22) PCT Filed: Jul. 6, 2010

(86) PCT No.: PCT/EP2010/004073
§ 371 (c)(1),
(2), (4) Date: Feb. 2, 2012

(87) PCT Pub. No.: WO2011/003570
PCT Pub. Date: Jan. 13, 2011

(65) Prior Publication Data
US 2012/0128443 A1 May 24, 2012

(30) Foreign Application Priority Data
Jul. 6, 2009 (FR) .................................... 09 54664

(51) Int. Cl.
*F16B 13/06* (2006.01)
(52) U.S. Cl.
USPC .............................. 411/44; 411/63; 411/80.5
(58) Field of Classification Search
USPC ............ 411/32, 44, 49, 55, 57.1, 58, 63, 80.5
See application file for complete search history.

(56) References Cited

U.S. PATENT DOCUMENTS

| 660,559 A * | 10/1900 | Church .......................... 411/26 |
| 1,276,708 A | 8/1918 | Bair |

(Continued)

FOREIGN PATENT DOCUMENTS

| DE | 1 968 797 | 9/1967 |
| DE | 296 21 943 | 3/1997 |
| EP | 0 477 707 | 4/1992 |
| GB | 2 061 440 | 5/1981 |

OTHER PUBLICATIONS

U.S. Appl. No. 13/382,243, filed Jan. 4, 2012, Fabre, et al.

(Continued)

*Primary Examiner* — Roberta Delisle
(74) *Attorney, Agent, or Firm* — Oblon, Spivak, McClelland, Maier & Neustadt, L.L.P.

(57) ABSTRACT

A device for mechanically linking with a rotating axis at least two parts, which is configured to extend in a longitudinal direction in coaxial bores formed respectively in the at least two parts hinged in relation to each other around the axis. The device includes: a cylindrical body including at least one end portion including at least one longitudinal slot, the cylindrical body including in the longitudinal direction a cylindrical bore extended by a frusto-conical bore extending in the at least one end portion configured to be located in another bore; an insert of frusto-conical shape substantially complementary to the frusto-conical bore, the insert including a tapped aperture extending in the longitudinal direction when the insert is accommodated in the frusto-conical bore, and a screw with a threaded end configured to cooperate by screwing with the tapped aperture of the insert allowing to lock the cylindrical body in the another bore and making a rotoide joint around axis.

12 Claims, 5 Drawing Sheets

(56) References Cited

U.S. PATENT DOCUMENTS

| | | | | |
|---|---|---|---|---|
| 1,349,437 | A | * | 8/1920 | Royer .............................. 411/24 |
| 1,359,833 | A | * | 11/1920 | Osgood .......................... 411/44 |
| 2,296,470 | A | | 9/1942 | Keehn |
| 3,373,648 | A | | 3/1968 | Pitzer |
| 3,524,379 | A | * | 8/1970 | Fischer ......................... 411/65 |
| 3,911,782 | A | * | 10/1975 | Liebig ........................... 411/24 |
| 3,954,345 | A | * | 5/1976 | Morris ......................... 403/297 |
| 4,112,813 | A | * | 9/1978 | Kuhlmann et al. ............ 411/49 |
| 5,685,678 | A | * | 11/1997 | Giannuzzi et al. ............. 411/55 |
| 5,702,216 | A | * | 12/1997 | Wu ............................... 411/32 |
| 5,725,341 | A | * | 3/1998 | Hofmeister .................... 411/32 |
| 5,813,808 | A | | 9/1998 | Wu |
| 6,293,743 | B1 | * | 9/2001 | Ernst et al. ..................... 411/24 |
| 6,712,544 | B2 | * | 3/2004 | Kruger et al. ............. 403/408.1 |
| 7,357,613 | B2 | * | 4/2008 | Houck et al. ................. 411/60.3 |
| 2002/0054805 | A1 | * | 5/2002 | Kaibach et al. ............. 411/60.1 |
| 2002/0106256 | A1 | * | 8/2002 | Kaibach et al. ............. 411/60.1 |
| 2004/0253075 | A1 | * | 12/2004 | Liebig et al. ................. 411/57.1 |
| 2005/0025602 | A1 | * | 2/2005 | Huang ......................... 411/57.1 |
| 2007/0224015 | A1 | * | 9/2007 | Ayrle ............................. 411/55 |

OTHER PUBLICATIONS

International Search Report Issued Nov. 30, 2010 in PCT/EP10/004073 Filed Jul. 6, 2010.

Russian Office Action issued on Nov. 19, 2013 in corresponding Russian application No. 2012103895/12(005789) with English translation.

* cited by examiner

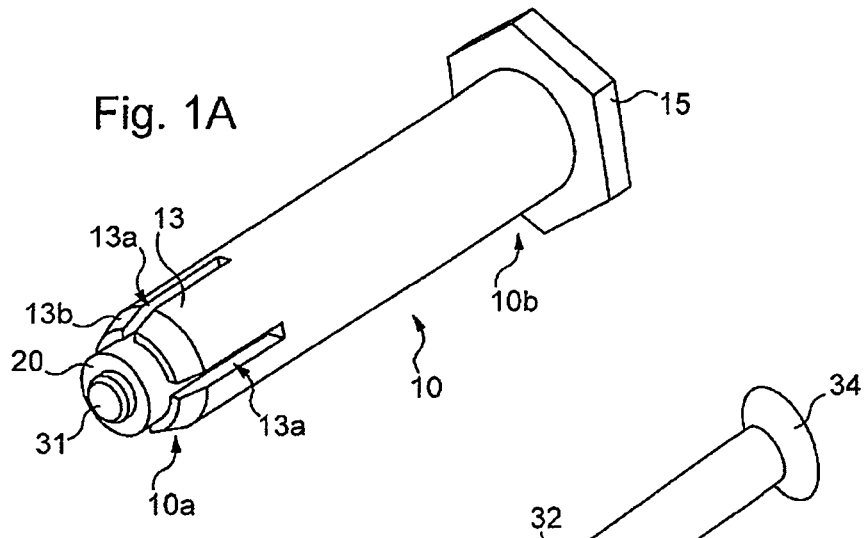
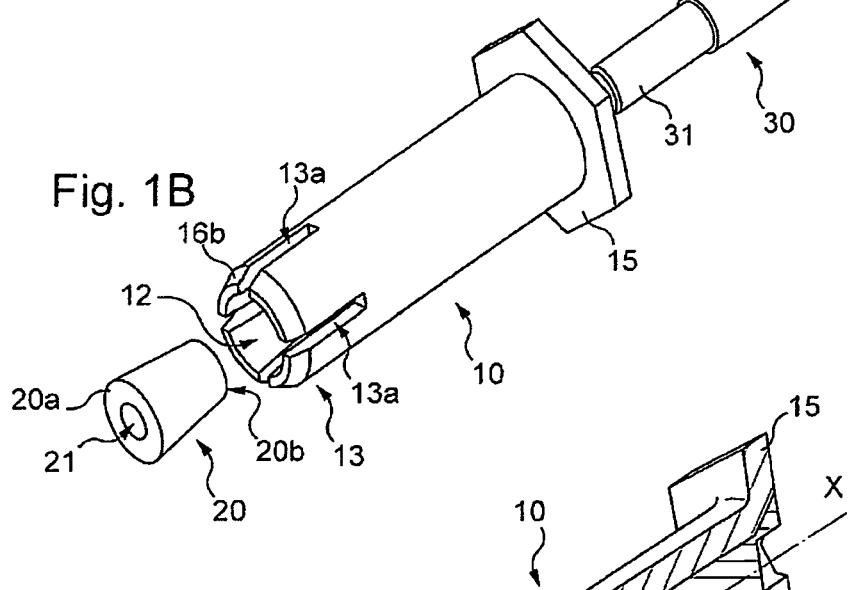
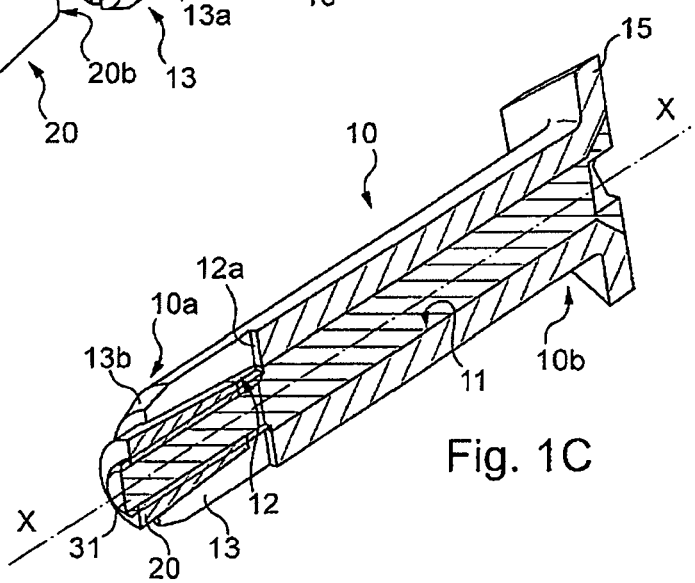

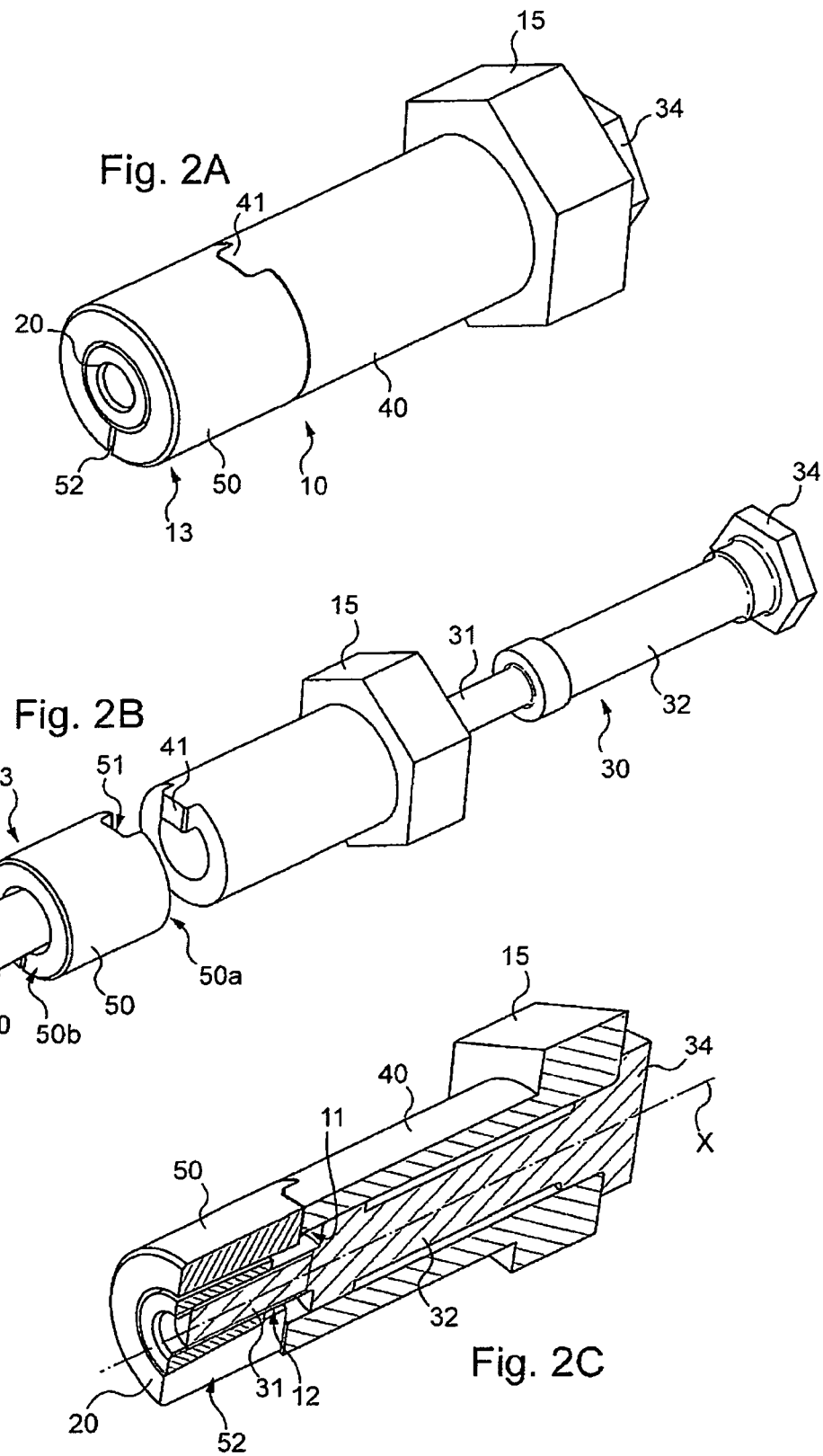

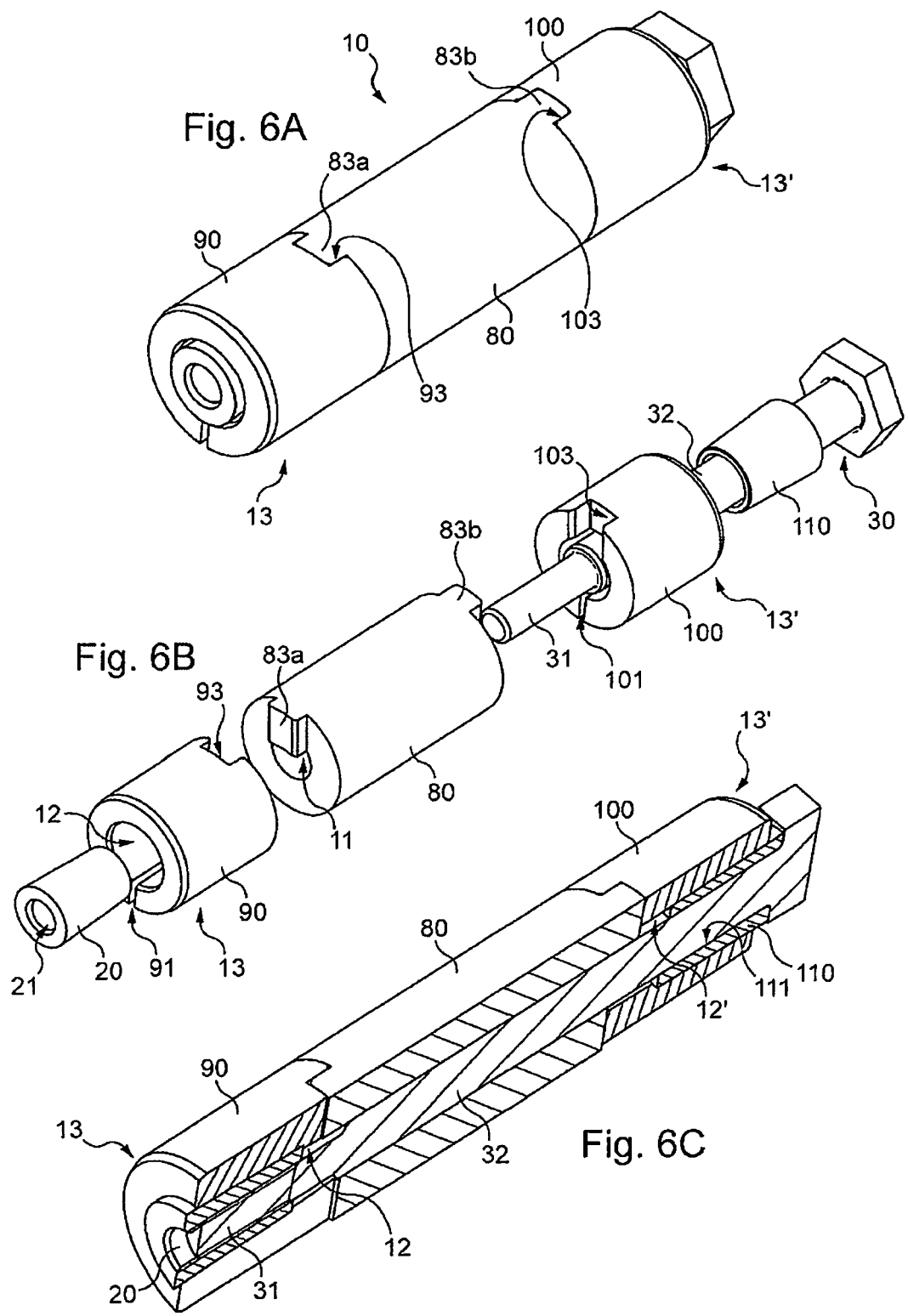

DEVICE FOR MECHANICALLY LINKING AT LEAST TWO PARTS HAVING COAXIAL BORES

The present invention relates to a device for mechanically linking at least two parts having coaxial bores.

The present invention is particularly applicable to the making of mechanical links between two parts where accessibility, overall size or, again, sealing problems exist imposing actions on only one side of one of the two parts.

More precisely, the invention relates non-exhaustively to the making of hinge axles and rotoide joints between two parts.

Whether the two parts are fixed or hinged, one in relation to the other, the installation of a mechanically linking device by means of two coaxial bores formed in said two parts induces embodiment constraints.

In particular, if the coaxial bores are plain, the installation of an axle to mechanically link said two parts requires the use for example of nuts or circlips to maintain the junction axle extending on either side of the two parts.

When a part is not accessible from one side of the installation or, again, one of the bores is not a through bore, particularly for sealing reasons, a tapped bore must be provided to allow for the attachment of an axle of the mechanical link.

In such a case, the mechanically linking device must be adapted both in its thread and in its length to the exact dimensions of the coaxial bores of the two parts to be assembled.

It is an object of the present invention to especially solve the above-mentioned disadvantages and to propose a universal mechanically linking device facilitating the linking of two parts to be assembled.

For this purpose, the present invention relates to a device for mechanically linking with rotating axis at least two parts, which is adapted to extend in a longitudinal direction X in coaxial bores formed respectively in said at least two parts hinged in relation to each other around axis X.

According to the invention, the mechanically linking device includes:
- a cylindrical body comprising at least one end portion provided with at least one longitudinal slot, said cylindrical body comprising in said longitudinal direction a cylindrical bore extended by a frusto-conical bore extending in said at least one end portion intended to be located in the bore of one of the parts,
- an insert with a frusto-conical shape substantially complementary to said frusto-conical bore, said insert comprising a tapped aperture extending in said longitudinal direction when said insert is accommodated in said frusto-conical bore and,
- a screw having a threaded end adapted to cooperate by screwing with said tapped aperture of said insert allowing to lock the cylindrical body in said bore of one of the parts and making a rotoide joint around axis X.

A functional clearance is easily adjustable to allow said mechanical link with rotating axis The screw is inserted in the internal hole of the cylindrical body, and thanks to the screwing of the screw into the tapped aperture of the insert, when said insert is accommodated in the slotted end portion of the cylindrical body, this slotted end portion is radially deformed by the cooperation of the insert of frusto-conical shape accommodated in the frusto-conical bore of substantially complementary shape.

The deformation of said at least one end portion of the cylindrical body of the mechanically linking device has the effect of immobilizing the cylindrical body in a bore of said parts to be assembled.

Such a mechanically linking device allows the adaptation in a certain proportion to bores of different diameters made in the parts to be assembled.

Moreover, the link by deformation of an end portion against a portion of the bore requires no tapping or specific machining of the bore.

Also, the attachment of the cylindrical body in one of the bores is not limited to a dedicated portion as would be the case with the making of a tapping. The mechanically linking device can to a certain extent adapt to different lengths of bores made in the parts to be assembled.

The mechanically linking device in accordance with the invention thus allows at least two parts to be assembled to form an articulation or an hinge without excessive manufacturing constraints concerning coaxial bores made in said parts.

Moreover, the mechanically linking device itself comprises a small number of cooperating parts, lower than the number of parts required used conventionally in mechanically linking devices of prior art.

According to a practical embodiment of the invention, the frusto-conical bore is connected at its small base to the cylindrical bore, the diameter of the small base being equal to the diameter of the cylindrical bore.

Thus, the installation of the mechanically linking device in coaxial bores made in the parts to be assembled is done by means of tension exerted by the screw on the insert of frusto-conical shape tending to move it in the end portion provided with the frusto-conical bore in the direction of the cylindrical bore.

Preferentially, the cylindrical body comprises a radial extension on an external wall of said cylindrical body.

Said radial extension is provided at one extremity and serves as abutment.

When two parts hinged in relation to each other are installed, an operating clearance must be provided between said parts.

The radial extension allows a shoulder to be created to insert a shim with a thickness adapted to the required clearance for the installation of two parts in contact with each other thanks to the mechanical linking device according to the invention.

According to one embodiment, said radial extension is an annular ring concentric with the cylindrical body along axis X.

According to another embodiment, said radial extension is ensured by a ring added to the cylindrical body.

In practice, to improve the distribution of the forces exerted by the slotted end portion expanding against the internal walls of a bore of one of the parts to be assembled, the end portion of the cylindrical body comprises at least two longitudinal slots communicating with the frusto-conical bore.

In a practical embodiment of the invention, allowing the manufacture of the cylindrical body with cylindrical bore extended by a frusto-conical bore to be simplified, said cylindrical body is constituted of a main cylindrical body and at least one secondary cylindrical body comprising said at least one end portion, said main cylindrical body and said at least one secondary cylindrical body comprising rotational blocking means relevant to said main cylindrical body and said at least one secondary cylindrical body disposed in the extension of each other.

Such a mechanical linking device is thus especially suitable for installing two parts hinged in relation to each other around the cylindrical body of the device serving as axle of articulation.

According to one embodiment, said secondary cylindrical body comprises on the side of its end intended to come into contact with the main cylindrical body a cylindrical extension.

According to one embodiment, the length of said at least one secondary cylindrical body is substantially equal to a third of the length of said main cylindrical body.

According to another characteristic of the invention, said cylindrical body comprises two opposite end portions each provided with at least one longitudinal slot, said cylindrical bore being extended at its ends by two frusto-conical bores extending respectively in said two end portions and the mechanical linking device comprises a first and a second insert of frusto-conical shape substantially complementary respectively to said frusto-conical bores of said two end portions, said first insert comprising a tapped aperture extending along said longitudinal direction, adapted to cooperate by screwing with the threaded end of said screw, and the second insert comprising a plain bore extending in said longitudinal direction, the diameter of said plain bore being substantially equal to or greater than the diameter of said screw.

Such a mechanically linking device is especially well adapted for installing two parts connected to each other by a rotoide joint, thanks to the cylindrical body comprising two deformable end portions.

Other features and advantages of the invention will become apparent on reading the following description.

On the accompanying drawings, given as non-limitative examples:

FIG. 1A is a perspective view of a mechanically linking device according to a first embodiment of the invention;

FIG. 1B is an exploded perspective view of the mechanically linking device of FIG. 1A;

FIG. 1C is a longitudinal cross-sectional view of the mechanically linking device of FIG. 1A;

FIG. 2A is a perspective view of a mechanically linking device according to a second embodiment of the invention;

FIG. 2B is an exploded perspective view of the mechanically linking device of FIG. 2A;

FIG. 2C is a longitudinal cross-sectional view of the mechanically linking device of FIG. 2A;

FIG. 6A is a perspective view of a mechanically linking device according to a fourth embodiment of the invention;

FIG. 6B is an exploded perspective view of the mechanically linking device of FIG. 6A and;

FIG. 6C is a longitudinal cross-sectional view of the mechanically linking device of FIG. 6A.

Figure 3:
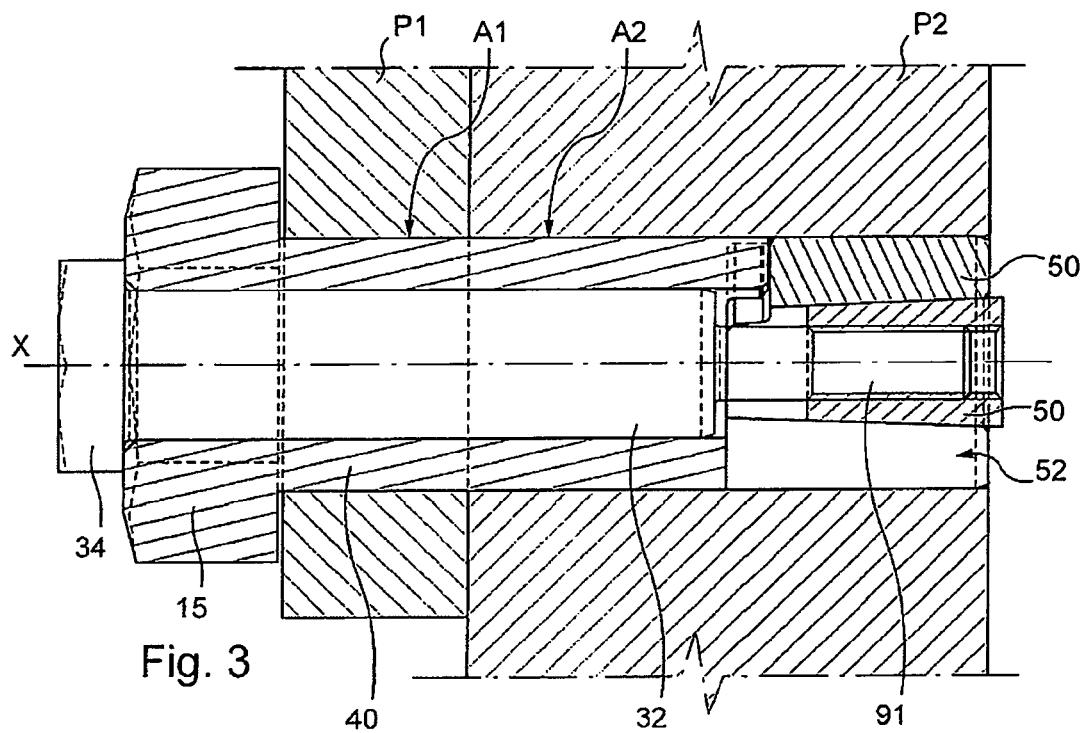
FIG. 3 is a longitudinal cross-sectional view illustrating the installation of a mechanically linking device according to the second embodiment to connect two parts.

A description will first of all be given in reference to FIGS. 1A, 1B and 1C of a mechanically linking device according to a first embodiment of the invention.

As detailed below, especially in reference to FIG. 3, such a mechanically linking device is adapted to ensure the connection of at least two parts provided respectively with two coaxial bores.

In principle, said mechanically linking device extends in a longitudinal direction X corresponding to the longitudinal direction of the coaxial bores in which it is installed.

Such a mechanically linking device thus defines an installation axis common to the two parts and these can then be hinged around the axis X of the mechanical linking device.

In principle, the mechanically linking device comprises a cylindrical body 10 extending in the longitudinal direction X.

In a general manner, the length of said cylindrical body 10 must be adapted to the length of the coaxial bores of the parts to be assembled and, in any case, sufficient to pass through a first part and extend sufficiently into the second part.

Moreover, the diameter of the cylindrical body 10 must be substantially lower than the diameter of the coaxial bores to allow for the insertion of the cylindrical body 10 into said bores.

As clearly illustrated on FIG. 1C, the cylindrical body 10 comprises in the longitudinal direction X a cylindrical bore 11 extended by a frusto-conical bore 12. The cylindrical body 10 is thus defined by an external cylindrical wall and an internal wall which is cylindrical in cylindrical the bore part 11 and frusto-conical in the frusto-conical bore part 12.

Said frusto-conical bore 12 extends into an end portion 13 of the cylindrical body 10.

In consideration of the introduction direction of the mechanically linking device into the coaxial bores of the parts to be assembled, said end portion 13 is located in this embodiment in the vicinity of the terminal end 10a of the cylindrical body 10, that is opposite the proximal end 10b intended to be handled by an operator when the mechanically linking device is inserted into the coaxial bores of the parts to be assembled.

As clearly illustrated on FIG. 1B, the end portion 13 of the cylindrical body 10 is provided with at least one longitudinal slot 13a and, here, with four longitudinal slots 13a disposed at 90° in the cylindrical wall of the cylindrical body 10.

Generally, the number of longitudinal slots 13a is not limitative.

When the end portion 13 comprises several longitudinal slots 13a, these are preferably equally distributed around the contour of the end portion 13.

As clearly illustrated on FIG. 1C, the frusto-conical bore 12 thus extends in the end portion 13 provided with longitudinal slots 13a and the longitudinal slots 13a communicate with the frusto-conical bore 12.

Said longitudinal slots 13 thus integrally traverse the wall of the cylindrical body 10 in the end portion 13.

As a non-limitative example, the length of the end portion 13 extends over around a quarter of the total length of the cylindrical body 10.

The frusto-conical bore 12 is defined in such a way that its small base 12a, connected to the cylindrical bore 11, has a diameter equal to the diameter of the cylindrical bore 11.

Also, the frusto-conical bore has a half-angle at the apex comprised between 1° and 5° and is preferentially substantially equal to 2.5°.

Moreover, in this embodiment and in a no way limitative manner, the end portion 13 comprises at its terminal end 13b corresponding to the terminal end 10a of the cylindrical body 10 a beveled external wall in such a way that the cylindrical body 10 has a slightly tapered terminal end 10a facilitating the insertion of the cylindrical body into a cylindrical bore of a part.

The mechanically linking device also comprises an insert 20 intended to be housed in the frusto-conical bore 12 of the cylindrical body 10.

For this purpose, the insert 20 also has an external frusto-conical shape substantially complementary to the frusto-conical bore 12 of the cylindrical body.

In particular, the insert of frusto-conical shape has a half-angle comprised between 1° and 5° and, here, substantially equal to 2.5°.

By selecting a half-angle lower than 5°, a jamming effect of the insert 20 in the frusto-conical bore 12 is ensured irrespective of the types of materials used to make the insert 20 and the cylindrical body 10.

Moreover, the large base 20a of the insert of frusto-conical shape 20 has a diameter slightly greater than or equal to the diameter of the large base of the frusto-conical bore 12, that is the outlet diameter of this frusto-conical bore 12 at the terminal end 10a of the cylindrical body 10.

Moreover, the length of the insert of frusto-conical shape 20 is substantially equal to the length of the end portion 13 into which the frusto-conical bore 12 extends.

Said insert of frusto-conical shape 20 also comprises a tapped aperture 21 extending in the longitudinal direction X when the insert 20 is housed in the frusto-conical bore 12 of the cylindrical body 10.

In this embodiment and in an in no way limitative manner, the tapped aperture 21 communicates both with the small base 20b of the insert of frusto-conical shape 20 and the large base 20a of the insert of frusto-conical shape 20.

Of course, the tapped orifice 21 can be blind and not communicate with the large base 20a of the insert 20.

The mechanically linking device lastly comprises a screw 30 with a threaded end 31 adapted to cooperate by screwing with the tapped orifice 21 of the insert of frusto-conical shape 20.

The screw has a length at least equal to the length of the cylindrical body 10. The length of the threaded end 31 is equal to the length of the end portion 13 of the cylindrical body 10 and therefore to the length of the insert of frusto-conical shape 20.

For an insert with a tapped orifice 21 communicating with the large base 20a, the length of the threaded end 31 can be greater than the length of the end portion 13 of the cylindrical body 10, but must be compatible with the hole of the part if the said hole is not uncorking.

Moreover, the diameter of the screw 30 is slightly lower than the diameter of the cylindrical bore 11 of the cylindrical body 10 to enable the introduction of said screw into the cylindrical body 10.

If the screw 30 comprises a plain cylindrical section 32, located upstream of the threaded end 31, the diameter of this plain cylindrical section 32 must be very slightly lower than the diameter of the cylindrical bore 11 of the cylindrical body 10 and the length of this plain cylindrical section 32 must be lower than the length of the cylindrical bore 11 of the cylindrical body 10.

On account of the dimensions of the tapped aperture 21 of the insert of frusto-conical shape 20, the threaded end 31 of the screw 30 has a diameter slightly lower than the diameter of the plain cylindrical section 32 of the screw 30.

Moreover, the end of the screw 30, opposite the threaded end 31, is provided with a head 34 of suitable form to enable the tightening and the untightening of said screw 30.

The manufacture of a screw head 34 is well known by those skilled in the art and has no need to be described in more detail here.

Preferentially, as illustrated on FIG. 1C, the cylindrical body 10 comprises at its proximal end 10b a machined housing 14 to accommodate the screw head 34.

Thus, the screw head 34 is embedded in the cylindrical body 10, limiting the overall size of said screw and improving the aesthetics of the mechanically linking device.

Finally, in this embodiment, the cylindrical body 10 is also provided at the proximal end 10b with a radial extension 15 on the outer wall of the cylindrical body 10.

In this embodiment, this radial extension is constituted of a circular crown 15, concentric with the cylindrical body 10 along longitudinal axis X.

This radial extension 15 can advantageously have a specific profile and, as illustrated on FIG. 1A, have an hexagonal profile.

This type of profile allows the cylindrical body 10 to be locked in rotation around its longitudinal axis X by means of a conventional tool of the adjustable wrench type.

During the installation of such a mechanically linking device in coaxial bores of two parts to be assembled, the insert of frusto-conical shape 20 is inserted into the frusto-conical bore 12 of complementary shape of the end portion 13 of the cylindrical body 10.

The screw 30 inserted by the proximal end 10b of the cylindrical body engages with the tapped aperture 21 at its threaded end 32.

The rotation of the screw 30 then drives in translation along the longitudinal axis X the insert of frusto-conical shape 30 which gradually comes into contact with the frusto-conical bore 12 of the cylindrical body 10.

The displacement of the insert of frusto-conical shape 20 towards the proximal end 10b of the cylindrical body 10 progressively leads to the deformation of the walls of the end portion 13 thanks to the longitudinal slots 13a.

In practice, the width of the longitudinal slots 13a tends to increase as and when the walls of the end portion 13 move away from the longitudinal axis X.

The diameter of the cylindrical body 10 at this end portion 13 thus has a tendency to increase and to come into contact with the internal walls of the bore into which the mechanically linking device is placed.

The installation of such a mechanically linking device will be described later in reference to FIG. 3 in a more detailed manner.

Now, in reference to FIGS. 2A to 2C, a mechanically linking device will be described according to a second embodiment of the invention.

In its principle, this second embodiment is identical to the first embodiment and the common elements have the same numerical references and will not be again described in detail.

However, the cylindrical body 10 is here made in two parts.

In this embodiment, the cylindrical body 10 is constituted of a main cylindrical body 40 and of a secondary cylindrical body 50 playing the role of the end portion 13 of the first embodiment.

The main cylindrical body 40 thus comprises the cylindrical bore 11 described previously and the secondary cylindrical body 50 comprises the frusto-conical bore 12.

The dimensions and relative arrangements of said cylindrical 11 and frusto-conical 12 bores described in reference to the first embodiment remain applicable here.

The insert of frusto-conical shape 20 is thus adapted to the shape of the frusto-conical bore 12 made in the secondary cylindrical body 50.

In operation, the main cylindrical body 40 and the secondary cylindrical body 50 are disposed in the extension of each other, rotational locking means 41, 51 being provided to lock the relative rotation of the main cylindrical body 40 and of the secondary cylindrical body 50 around the longitudinal axis X of the mechanically linking device.

In this embodiment, said locking means comprise a stud 41 placed at an end 40*a* of the main cylindrical body 40.

In a complementary manner, the secondary cylindrical body 50 comprises a machined housing 51 of shape complementary to the stud 41 to accommodate said stud here with the form of a locking slot 51.

Said locking slot 51 is made at an end 50*a* of the secondary cylindrical body 50, designed to come into contact with the end 40*a* of the main cylindrical body 40 when said ends 40*a*, 50*a* are disposed in the extension of each other along longitudinal axis X.

Of course, any other embodiment or inversion of the locking means can be used to prevent the relative rotation of the main cylindrical body 40 and of the secondary cylindrical body 50.

In this embodiment, the secondary cylindrical body 50 comprises a single slot 52 disposed in the longitudinal direction of the mechanically linking device and communicating with the frusto-conical bore 12.

Preferentially, said longitudinal slot 52 has a width as low as possible determined according to the manufacturing constraints of the secondary cylindrical body 50.

As a non-limitative example, the length of the secondary cylindrical body 50 is substantially equal to a third of the length of the main cylindrical body 40.

Now, in reference to FIG. 3, the installation of a mechanically linking device will be described according to said second embodiment of the invention in two parts P1, P2 to be assembled.

Apart from the fact that the end portion 13 is attached to the cylindrical body 10, the installation and the operating principle of the mechanically linking device according to the first embodiment are similar to those described below.

FIG. 3 illustrates the installation of a mechanically linking device for the making of a rotoide joint along the X-axis of two parts P1, P2.

Said parts P1, P2 respectively comprise two coaxial bores A1, A2 of substantially identical diameters and which must be slightly greater than the diameter of the cylindrical body 10 of the mechanically linking device.

The assembly of the mechanically linking device consists in placing the secondary cylindrical body 50 in the extension of the main cylindrical body 40 in such a way that the locking stud 41 is inserted into the locking slot 51 of the secondary cylindrical body.

The insert of frusto-conical shape 20 is then placed in the secondary cylindrical body 50 on its terminal face 50*b* side.

As the insert of frusto-conical shape 20 and the frusto-conical bore 12 have perfect geometrical adequation, the insert of frusto-conical shape 20 is perfectly accommodated in the frusto-conical bore 12 of the secondary cylindrical body 50.

The screw is then inserted into the cylindrical bore 11 of the main cylindrical body 40 on radial extension 15 side.

On account of the tapped aperture 21 made in the insert of frusto-conical shape 20, the rotation of the screw 30 causes the translation of this insert of frusto-conical shape 20 in the frusto-conical bore 12 of the secondary cylindrical body 50.

In this position, the screw 30 is driven in rotation, the main cylindrical body 40 being maintained immobile in the bores A1, A2 as said main cylindrical body is restrained at the radial extension 15.

Thanks to the complementary locking means 41, 51, the secondary cylindrical body 50 is also locked in rotation with the main cylindrical body 40.

The rotational displacement of the screw 30 then drives the displacement of the insert of frusto-conical shape 20 which comes into contact with the internal frusto-conical bore 12 of the secondary cylindrical body 50.

Once contact has been made between the insert of frusto-conical shape 20 and the secondary cylindrical body 50, the action of continuing to turn the screw 30 exerts a traction force in the direction of arrow F on the insert of frusto-conical shape 20 in the direction of the main cylindrical body 40.

This force will lead to a contact pressure between the insert of frusto-conical shape 20 and the secondary cylindrical body 50.

Due to the presence of at least one longitudinal slot 52, the secondary cylindrical body 50 deforms along its diameter.

This diametric expansion will fill the small clearance existing between the initial diameter of the secondary cylindrical body 50 and the diameter of the bore A2 made in one of the parts and, here, in part P2.

Thus, the clearance existing between the secondary cylindrical body 50 and the bore A2 of the part P2 is eliminated, causing the locking of the complete cylindrical body 10 constituted of the main cylindrical body 40 and of the secondary cylindrical body 50.

The adjustment of the clearance J between the parts P1, P2 in contact with each other can be done by inserting a shim of thickness J between the radial extension 15 thus forming a shoulder opposite one of the parts and, here, part P1.

It is to be noted that a direct relation exists between the traction force exerted by the screw 30 on the insert of frusto-conical shape 20 and the maximum axial force or the maximum torque to which the mechanically linking device can be submitted once locked.

By measuring the torque exerted on the screw 30, for example by means of a torque wrench, the maximum axial force liable to be supported by the cylindrical body 10 of the mechanically linking device, or alternatively, the maximum torque transmissible by this axle on the part P2 can be adjusted.

Thus, in a simple manner, a rotoide joint can be made around an axis X of two parts P1, P2 thanks to the locking of the cylindrical body 10 of the mechanically linking device in a bore A2 of one of the parts P2.

It is to be noted that the mechanically linking device described eliminates the need for the various rotation maintaining systems generally used in prior art (set screw, key, spline), requiring complex and/or costly machining operations.

The mechanically linking device described above is thus especially well adapted to the installation of two parts hinged in relation to each other around the cylindrical body 10 of the device.

Figure 4:
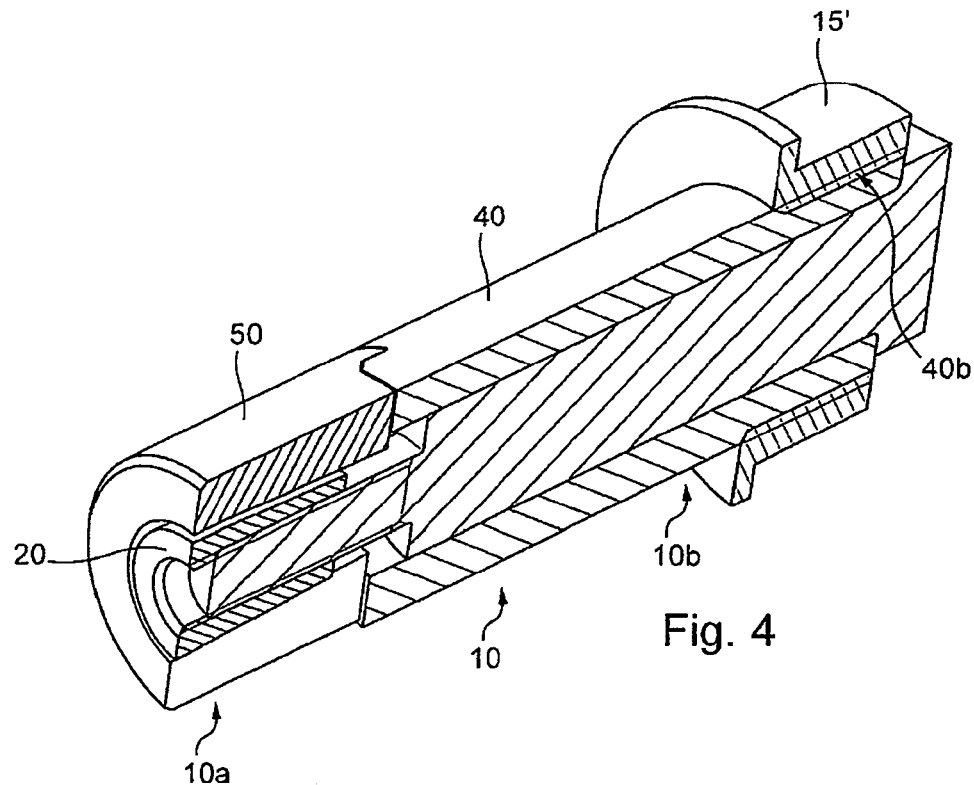
FIG. 4 is a longitudinal cross-sectional view illustrating a variant of the mechanically linking device according to the second embodiment of the invention.

FIG. 4 illustrates an alternative of the second embodiment described previously in reference to FIGS. 2A to 2C.

Thus, said mechanically linking device is from all points of view identical to the previously described device apart from the making of the radial extension 15.

Here, this radial extension 15 is not an integral part of the cylindrical body 10 of the mechanically linking device but is comprised of a ring 15' added to the cylindrical body 10 at its proximal end 10*b*.

Thus, for example, the radial extension is ensured by a ring 15' installed by screwing onto a threaded end 40*b* of the main cylindrical body 40.

Figure 5A:
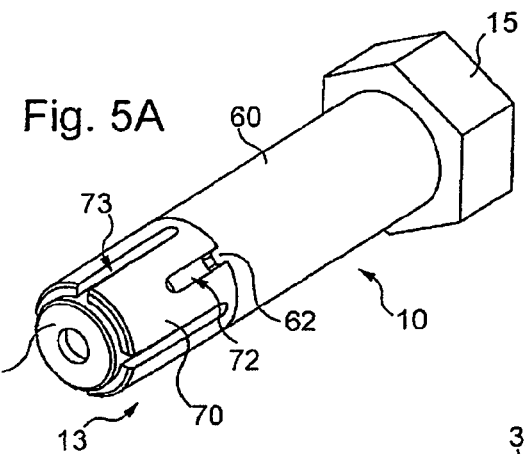
FIG. 5A is a perspective view of a mechanically linking device according to a third embodiment of the invention.
Figure 5B:
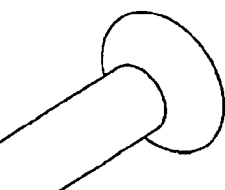
FIG. 5B is an exploded perspective view of the mechanically linking device of FIG. 5A.
Figure 5C:
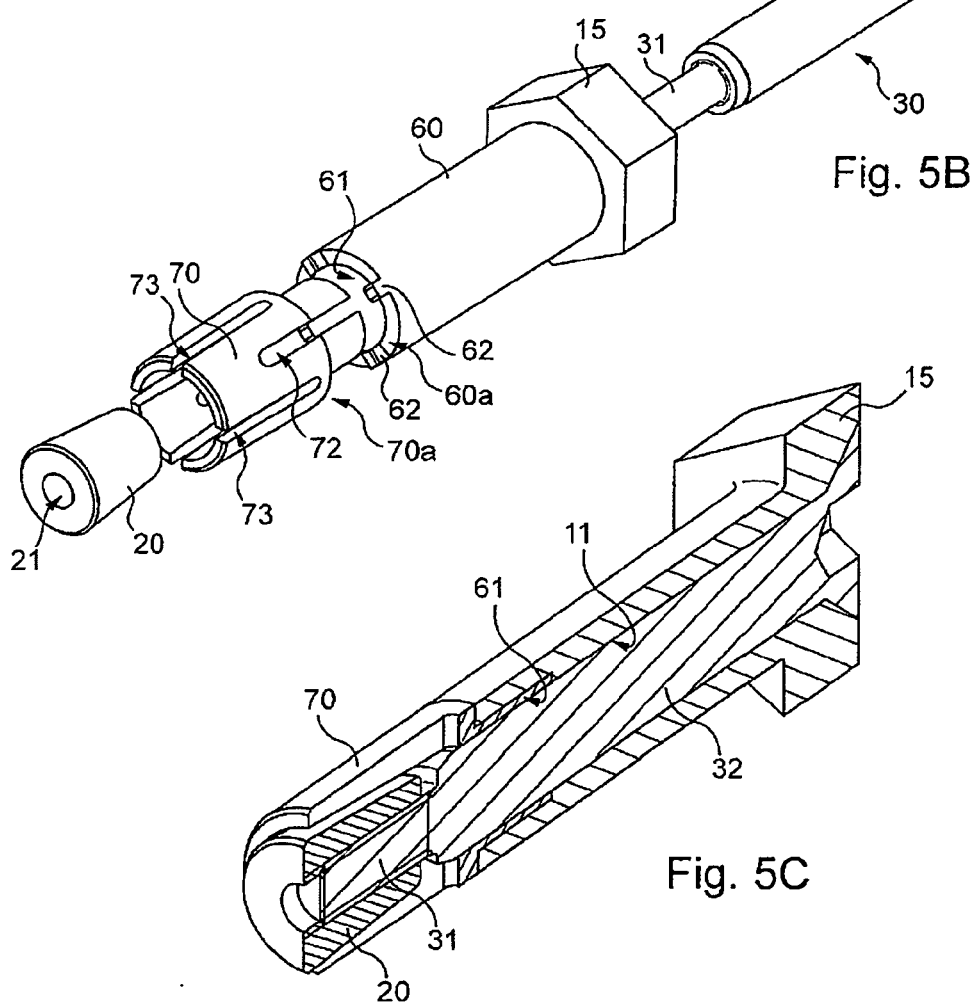
FIG. 5C is a longitudinal cross-sectional view of the mechanically linking device of FIG. 5A.

A third embodiment is also illustrated on FIGS. 5A, 5B, 5C.

In its principle, the mechanically linking device is similar to the one described in reference to FIGS. 2A to 2C, the cylindrical body 10 being comprised of a main cylindrical body 60 and of a secondary cylindrical body 70.

To facilitate the installation of the secondary cylindrical body 70 on the main cylindrical body 60, the secondary cylindrical body 70 comprises, on the side of its end 70a intended to come into contact with the main cylindrical body 60, a cylindrical extension 71 of diameter slightly lower than the external diameter of the secondary cylindrical body 70.

In a complementary manner, the main cylindrical body 60, comprises on the side of its end 60a intended to come into contact with the secondary cylindrical body 70, an internal cylindrical bore 61 intended to accommodate the cylindrical extension 71 of the secondary cylindrical body 70.

As clearly illustrated on FIG. 5C, the internal cylindrical bore 61 has a diameter slightly greater than the cylindrical bore 11 provided to pass the screw 30 in the mechanically linking device.

The installation in the extension of each other of the main cylindrical body 60 and of the secondary cylindrical body 70 is thus facilitated by the presence of this cylindrical extension 71.

Moreover, the rotational locking means of the main cylindrical body 60 and of the secondary cylindrical body 70 are here ensured by a set of studs 62, for example four.

Of course, the number of studs is not limitative.

Said studs 62 are designed to cooperate, as described previously, with complementary slots 72 provided in the secondary cylindrical body 70.

Finally, as described previously in relation to the first embodiment of the invention, the mechanically linking device according to said third embodiment comprises, in the secondary cylindrical body 70, several slots 73 allowing the radial expansion of said secondary cylindrical body 70, as described previously, during the gradual insertion of the insert of frusto-conical shape 20.

Said third embodiment of the invention thus presents different variants which can be combined in one way or another with the first and second embodiments described previously.

Lastly, a fourth embodiment of the invention will be described in reference to FIGS. 6A to 6C where the mechanically linking device comprises two portions deformable in their diameters.

Thus, in principle, the mechanically linking device comprises here two deformable end portions 13, 13'.

More precisely, in this embodiment, the mechanically linking device comprises a main cylindrical body 80 extended, at each of its ends, by two secondary cylindrical bodies 90, 100, thus comprising two opposite end portions 13, 13' of the cylindrical body 10.

To enable the radial deformation of said secondary cylindrical bodies 90, 100, they each comprise respectively at least one longitudinal slot 91, 101.

The installation of said secondary cylindrical bodies 90, 100, at each end of the main cylindrical body 80 is similar to that described previously in reference to FIGS. 2A to 2C and has no need to be redescribed here in more detail.

To guarantee the rotational locking of the secondary cylindrical bodies 90, 100, the main cylindrical body 80 here comprises two studs 83a, 83b adapted to be accommodated in complementary slots 93, 103 made respectively in the secondary cylindrical bodies 90, 100.

The lengths of the secondary cylindrical bodies 90, 100 can vary and, for example, can be advantageously equal to around one third of the length of the main cylindrical body 80.

The main cylindrical body 80 comprises the cylindrical bore 11 as described previously.

Said main cylindrical body is extended at its ends by two frusto-conical bores 12, 12' which extend respectively in the two end portions 13, 13' of the cylindrical body 10 constituted of the two secondary cylindrical bodies 90, 100.

In the embodiment illustrated on FIG. 6C, the two frusto-conical bores 12, 12' have identical shapes.

Of course, said frusto-conical bores 12, 12' could also have different frusto-conical shapes both in length and in the opening angle of the frusto-conical shape.

The mechanically linking device then comprises two inserts of frusto-conical shape 20, 110, substantially complementary respectively to the frusto-conical bores 12, 12' of the two secondary cylindrical bodies 90, 100.

A first insert 20 is identical to the one described previously in reference especially to FIGS. 1A to 1C.

In particular, this first insert 20, cooperating for example with the frusto-conical bore 12 of a first secondary cylindrical body 90 is provided with a tapped aperture 21 adapted to cooperate with the threaded end 32 of the screw 30.

However, the second insert of frusto-conical shape 110, adapted to cooperate with the frusto-conical bore 12' of the second secondary cylindrical body 100, comprises a plain cylindrical bore 111.

The diameter of this plain cylindrical bore 111 is substantially greater than the diameter of the screw 30 and, more especially, the diameter of the plain cylindrical portion 32 of the screw 30.

The plain cylindrical bore 111 is made by means of a bore communicating with each side of the second insert of frusto-conical shape 110.

The screw 30 has a length slightly greater than the sum of the lengths of the main cylindrical body 80 and of the secondary cylindrical bodies 90, 100.

It can easily be understood that when the screw 30 is tightened, the two inserts of frusto-conical shape 20, 110 have a tendency to approach each other in the direction of the main cylindrical body 80 which leads to the radial expansion of the two secondary cylindrical bodies 90, 100.

When the secondary cylindrical bodies 90, 100 are placed respectively in two coaxial bores of two parts to be assembled, the installation of the mechanically linking device allows the installation of these two parts fixed one in relation to the other.

The higher the torque exerted on the screw 30, the more the mechanical link between the two parts fixed in relation to each other will be capable of supporting a high force.

It is to be noted that in this fourth embodiment, the mechanically linking device is intended to be integrally accommodated in the coaxial bores of the parts to be assembled in such a way that the cylindrical body comprises no radial extension to define a shoulder as described in the previous embodiments.

The present invention thus enables various embodiments of a mechanically linking device by controlled deformation to be proposed enabling an attachment of the device in the coaxial bores of parts to be assembled without the use of accessories (nuts, circlips, etc.) protruding from the parts to be assembled.

The mechanically linking device can also be installed and removed rapidly without requiring complex machining in the parts to be assembled to ensure the maintaining of the mechanically linking device in its housing or for the transmission of a torque.

Moreover, when the mechanically linking device is used to install in rotation two parts in relation to each other, it enables a fine adjustment of the functional clearance indispensible for this mechanical link with rotating axis.

Lastly, due to the radial expansion of the mechanically linking device, said device is adaptable somewhat to the dimensions of the coaxial bores of the parts to be assembled.

Such a mechanical linking device can thus be used for coaxial bores belonging to a determined range of lengths and diameters.

Of course, the present invention is not limited to the embodiment examples described above.

In particular, the characteristics described for each of the embodiments can be combined.

In particular, the fourth embodiment described in reference to FIGS. 6A to 6C, with two deformable end portions 13 made by secondary cylindrical bodies 90, 100 can also be made directly in a single cylindrical body provided with two end portions similar to the ones described in reference to the first embodiment.

The invention claimed is:

1. A device for mechanically linking with a rotating axis at least two parts, which is configured to extend in a longitudinal direction in coaxial bores formed respectively in the at least two parts hinged in relation to each other around the axis, the device comprising:
   a cylindrical body including at least one end portion including at least one longitudinal slot, the cylindrical body including in the longitudinal direction a cylindrical bore extended by a frusto-conical bore, the frusto-conical bore formed into the cylindrical body and extending in the at least one end portion that is configured to be located in a bore of one of the at least two parts;
   an insert of frusto-conical shape substantially complementary to the frusto-conical bore, the insert including a tapped aperture extending in the longitudinal direction when the insert is accommodated in the frusto-conical bore; and
   a screw with a threaded end configured to cooperate by screwing with the tapped aperture of the insert allowing locking of the cylindrical body in the bore of the one of the at least two parts and making a rotary joint around the cylindrical body for another of the at least two parts.

2. A mechanically linking device according to claim 1, wherein a functional clearance is adjustable to allow the mechanical link with the rotating axis.

3. A mechanically linking device according to claim 1, wherein the cylindrical body includes a radial extension on an outer wall of the cylindrical body.

4. A mechanically linking device according to claim 3, wherein the radial extension is an annular ring concentric with the cylindrical body along the axis.

5. A mechanically linking device according to claim 3, wherein the radial extension is ensured by a ring added to the cylindrical body.

6. A mechanically linking device according to claim 1, wherein the cylindrical body includes a main cylindrical body and at least one secondary cylindrical body including the at least one end portion, the main cylindrical body and the at least one secondary cylindrical body including a relative rotation locking device of the main cylindrical body and of the at least one secondary cylindrical body disposed in the extension of each other.

7. A mechanically linking device according to claim 6, wherein the secondary cylindrical body includes a cylindrical extension on the side of its end configured to come into contact with the main cylindrical body.

8. A mechanically linking device according to claim 6, wherein the length of the at least one secondary cylindrical body is substantially equal to a third of the length of the main cylindrical body.

9. A mechanically linking device according to claim 1, wherein the cylindrical body includes two opposite end portions each including at least one longitudinal slot, the cylindrical bore being extended at its ends by two frusto-conical bores extending respectively in the two end portions, and wherein the mechanically linking device includes a first and a second insert of frusto-conical shape substantially complementary respectively to the frusto-conical bores of the two end portions, the first insert including a tapped aperture extending in the longitudinal direction, configured to cooperate by screwing with the threaded end of the screw, and the second insert including a plain bore extending in the longitudinal direction, the diameter of the plain bore being substantially greater than the diameter of the screw.

10. A mechanically linking device according to claim 1, wherein the frusto-conical bore includes a half-angle at an apex in a range of 1° to 5°.

11. A mechanically linking device according to claim 1, wherein the cylindrical body includes a main cylindrical body and at least one secondary cylindrical body including the at least one end portion, the main cylindrical body and the at least one secondary cylindrical body including a relative rotation means for locking of the main cylindrical body and of the at least one secondary cylindrical body disposed in the extension of each other.

12. A mechanically linking device according to claim 1, wherein the insert includes a half-angle that is in a range of 1° to 5° so that the insert is jammable in the frusto-conical bore.

* * * * *